n(12) United States Patent
Zhao et al.

(10) Patent No.: US 11,370,902 B2
(45) Date of Patent: Jun. 28, 2022

(54) ARTICLES COMPRISING POLYPROPYLENE IMPACT COPOLYMERS AND METHODS OF MAKING THE SAME

(71) Applicant: ExxonMobil Chemical Patents Inc., Baytown, TX (US)

(72) Inventors: Bin Zhao, Songjing (CN); Na Li, Shanghai (CN); Jie Hui Xu, Shanghai (CN); William A. Ramsey, The Woodlands, TX (US); Robert J. Wittenbrink, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 297 days.

(21) Appl. No.: 16/640,205

(22) PCT Filed: Jun. 7, 2018

(86) PCT No.: PCT/US2018/036418
§ 371 (c)(1),
(2) Date: Feb. 19, 2020

(87) PCT Pub. No.: WO2019/050582
PCT Pub. Date: Mar. 14, 2019

(65) Prior Publication Data
US 2020/0207961 A1 Jul. 2, 2020

Related U.S. Application Data

(60) Provisional application No. 62/556,773, filed on Sep. 11, 2017.

(51) Int. Cl.
*C08L 23/12* (2006.01)
*C08K 3/013* (2018.01)
*B29C 45/00* (2006.01)
*C08K 3/04* (2006.01)
*C08K 3/36* (2006.01)
*C08K 5/09* (2006.01)
*C08L 23/16* (2006.01)
*C08L 23/18* (2006.01)

(52) U.S. Cl.
CPC .......... *C08L 23/12* (2013.01); *B29C 45/0001* (2013.01); *C08K 3/013* (2018.01); *C08K 3/04* (2013.01); *C08K 3/36* (2013.01); *C08K 5/09* (2013.01); *C08L 23/16* (2013.01); *C08L 23/18* (2013.01); *C08L 2203/30* (2013.01); *C08L 2205/025* (2013.01); *C08L 2205/03* (2013.01); *C08L 2207/04* (2013.01)

(58) Field of Classification Search
CPC ...... C08L 23/16; C08L 23/12; C08L 2207/04; C08L 2207/02; B29C 45/00; B29C 45/14
See application file for complete search history.

(56) References Cited

U.S. PATENT DOCUMENTS

| | | |
|---|---|---|
| 8,071,220 B2 | 12/2011 | Abraham et al. |
| 8,981,013 B2 | 3/2015 | Silvis et al. |
| 10,344,151 B2 | 7/2019 | Xu et al. |
| 2007/0155905 A1 | 7/2007 | Drewniak et al. |
| 2010/0105848 A1 | 4/2010 | Meka et al. |
| 2010/0331466 A1* | 12/2010 | Ouhadi ............... C08L 23/0815 264/254 |
| 2011/0024951 A1 | 2/2011 | Kolb |
| 2015/0174803 A1 | 6/2015 | Newman et al. |
| 2016/0230000 A1 | 8/2016 | Gu |

FOREIGN PATENT DOCUMENTS

| | | |
|---|---|---|
| EP | 2083046 A | 7/2009 |
| WO | WO 2015/108634 A1 | 7/2015 |

* cited by examiner

*Primary Examiner* — Mark S Kaucher
(74) *Attorney, Agent, or Firm* — Vorys, Sater, Seymour and Pease LLP

(57) ABSTRACT

Disclosed are propylene-based articles which can provide desired glossy surface including an impact copolymer substrate and a propylene-based elastomer body part overmolding, and a method of making such articles.

14 Claims, No Drawings

ARTICLES COMPRISING POLYPROPYLENE IMPACT COPOLYMERS AND METHODS OF MAKING THE SAME

PRIORITY

This application is a National Phase Application claiming priority to PCT Application Serial No. PCT/US2018/036418, filed Jun. 7, 2018, which claims priority to and the benefit of U.S. Provisional Application No. 62/556,773, filed Sep. 11, 2017, and is which are incorporated herein by reference.

FIELD OF THE INVENTION

This invention relates to articles, and in particular, to articles comprising polypropylene impact copolymers, and methods for making the same.

BACKGROUND OF THE INVENTION

Molding is a manufacturing process for producing a shaped articles by injecting a molten plastic or metal material into a mold cavity and cooling and hardening the material to the configuration of the cavity. In 'overmolding', a previously molded part can be reinserted to a new mold to allow a new molded layer to form around the previously molded part, and becomes integral to the new article. Typically, a first material, usually referred to as the 'substrate', is partially or fully covered by subsequent materials (overmolding materials) during the manufacturing process. If properly selected, the overmolding material will form a strong bond with the substrate that is maintained in the end-use environment, thus the use of primers or adhesives is no longer required to achieve an optimum bond between the overmolding material and the substrate. This combination of two different components allows for the creation of strong, structural products with enhanced features, including improved grip and vibration damping, water resistant seal, sound absorption, electrical insulation, and ergonomic comfort, thus making it widely used by a broad variety of applications such as electrical and electronic assemblies, automotive components, building and construction, household appliances, industrial equipment, healthcare and medical devices, and personal and/or sports protection.

With any overmolding application, the challenge lies in achieving maximum adhesion between the overmolding material and the substrate. Thermoplastic elastomer (TPE) compounds, which are polymer materials that exhibit elasticity while remaining thermoplastic, have long been among the most popular selection of overmolding materials for manufacturing bumper, grip, or soft skin of products, as a result of its good adhesion to polyolefin-based substrates. However, TPE, particularly polyolefin-based elastomer, has not been very appealing to some substrates made of engineering resins, such as those made of acrylonitrile butadiene styrene (ABS), because the overmold TPE may be easily peeled off from the substrate due to poor adhesion between the two materials. Meanwhile, conventionally available polyolefin-based materials usually fail to provide gloss that can adapt to standards desired by specific applications favoring high gloss surface. Therefore, it has been difficult for TPE materials to penetrate ABS-based overmolding markets.

US 2016/230000 discloses a thermoplastic elastomer compound including styrenic block copolymer and high softening point tackifier. The styrenic block copolymer has a 'Copolymer' Tan Delta Peak Temperature and the thermoplastic elastomer compound has a 'Compound' Tan Delta Peak Temperature. The Compound Tan Delta Peak Temperature is greater than the Copolymer Tan Delta Peak Temperature. The thermoplastic elastomer compound exhibits useful damping properties at or above room temperature while also possessing improved stability for processing and/or applications at high temperatures and upon exposure to weathering.

US 2015/174803 provides a method for injection molding overmolded articles includes heating thermoplastic material to a predetermined temperature in an injection molding apparatus. The injection molding apparatus has a mold including a mold cavity. The injection molding apparatus has a useful life of more than 1 million injection molding cycles and less than 20 million injection molding cycles. The method further includes positioning a pre-manufactured article in the mold cavity, advancing heated thermoplastic material from the melt holder of the injection molding apparatus into the mold cavity maintaining a substantially constant melt pressure in the proximity of the injection element of at least 400 pounds per square inch (2 MPa) and at most 10,000 pounds per square inch (69 MPa).

U.S. Pat. No. 8,981,013 relates to polyolefin blend compositions of polar and/or non-polar polymers, with at least one functionalized polyolefin polymer selected from the group consisting of: amine functionalized, hydroxyl functionalized, imide functionalized, anhydride functionalized, or carboxylic acid functionalized polyolefin polymers. This disclosure also provides methods for making the functionalized polyolefin polymer. This disclosure also provides for materials and articles containing at least one component prepared from such compositions.

U.S. Pat. No. 8,071,220 provides thermoplastic vulcanizate compositions having good adhesion to unheated polar substrates including an amount of functionalized polyolefin that comprises greater than 80% of the total polyolefin of the TPV. The functional group may be an anhydride. Exemplary TPVs may further include polyamide, and an elastomer, which may include one or more of conjugated diene rubber, unsaturated styrenic triblock copolymer rubber, hydrogenated styrenic triblock copolymer rubber, ethylene/alpha-olefin rubber, and ethylene/alpha-olefin/non-conjugated diene rubber. The TPVs may have hardness values of less than 85 Shore A and peel forces with respect to unheated polar substrates of greater than 15 pli. Articles comprising polar substrates and TPVs are also taught.

That said, there remains a need for a solution to conveniently and efficiently apply polyolefin-based TPE compounds in overmolding applications favoring high gloss that are currently dominated by ABS without compromising any other desired property. The inventors have found that the above objective can be achieved by overmolding a body part comprising a propylene-based elastomer material onto a substrate replacing ABS with a propylene-based impact copolymer (ICP) having high gloss and impact resistance to form an overmold article. Compared to articles with the same propylene-based elastomer material overmolded onto ABS-based substrate, such design can deliver enhanced bonding strength between the body part and the substrate since the propylene-based elastomer has much higher compatibility with ICP, while high gloss and desired levels of other properties including impact absorption and stiffness can also be expected. Accordingly, manufacturers in the overmolding industry would be released from the limit of having to rely on ABS to obtain high gloss by a promising alternative presenting a well-accomplished overall property performance.

SUMMARY OF THE INVENTION

Provided are articles comprising polypropylene impact polymers (also known in the art as heterogeneous or heterophasic composition, or block copolymers, etc.), methods for making such articles, and home appliances made therefrom.

In one embodiment, the present invention encompasses an article, comprising (or consisting of, or consisting essentially of) a substrate and a body part attached to the substrate, wherein (a) the substrate comprises at least 80 wt % of an impact copolymer (ICP), based on total weight of the substrate, the ICP comprising a polypropylene homopolymer and within the range of from 6 to 20 wt % of propylene copolymer based on the weight of the ICP, wherein the propylene copolymer comprises from 20 to 60 wt % ethylene and/or $C_4$ to $C_{10}$ α-olefin derived units and the remainder propylene-derived units based on the weight of the propylene copolymer, the ICP having a melt flow rate (MFR) (230° C./2.16 kg) within the range of from 5 to 50 g/10 min; and (b) the body part comprises at least 50 wt % of a propylene-based elastomer, based on total weight of the body part, comprising at least 60 wt % propylene-derived units and 3 to 25 wt % ethylene-derived units, based on the total weight of the propylene-based elastomer, wherein the propylene-based elastomer has a heat of fusion of less than 80 J/g.

In another embodiment, the present invention relates to a method for making an article, comprising (or consisting of, or consisting essentially of) the steps of: (a) preparing a substrate comprising at least 80 wt % of an ICP, based on total weight of the substrate, the ICP comprising a polypropylene homopolymer and within the range of from 6 to 20 wt % of propylene copolymer based on the weight of the ICP, wherein the propylene copolymer comprises from 20 to 60 wt % ethylene and/or $C_4$ to $C_{10}$ α-olefin derived units and the remainder propylene-derived units based on the weight of the propylene copolymer, the ICP having an MFR (230° C./2.16 kg) within the range of from 5 to 50 g/10 min; (b) preparing a body part comprising at least 50 wt % of a propylene-based elastomer, based on total weight of the body part, comprising at least 60 wt % propylene-derived units and 3 to 25 wt % ethylene-derived units, based on the total weight of the propylene-based elastomer, wherein the propylene-based elastomer has a heat of fusion of less than 80 J/g; and (c) forming an article comprising the substrate and the body part by attaching the body part to the substrate.

The substrate and the body part of the article described herein or made according to any method disclosed herein may remain attached to each other under a peeling force of 900 N. Also provided are home appliances comprising any of the articles described herein or made according to any method disclosed herein.

DETAILED DESCRIPTION OF THE PRESENT INVENTION

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polypropylene," "propylene polymer," and "propylene-based polymer" mean a polymer or copolymer comprising at least 50 mol % propylene units (preferably at least 70 mol % propylene units, more preferably at least 80 mol % propylene units, even more preferably at least 90 mol % propylene units, even more preferably at least 95 mol % propylene units or 100 mol % propylene units (in the case of a homopolymer)). Furthermore, the term "polypropylene composition" means a composition containing one or more polypropylene components.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

Impact Copolymer

In one aspect of the invention, the impact copolymer that can be used for the article described herein has a relatively low level of ethylene comonomer incorporation and low copolymer incorporation. This is unique because most catalyst systems used to produce the polypropylene component and copolymer components of ICPs tend to incorporate too large an amount of ethylene-derived units (or other comonomer) into the copolymer component. This occurs because most polyolefin catalysts, especially Ziegler-Natta catalysts that are titanium/magnesium based, tends to lose activity over time (the active metal center $Ti^{4+}$ changes to $Ti^{3+}$ with resident time in the reactor and the $Ti^{3+}$ site prefers to incorporate ethylene monomer over propylene monomer), thus, a very high incorporating catalyst is used to compensate for this. In addition, most catalyst systems are not able to produce ICP granules with a desirable flowability to prevent clogging in the subsequent polymerization-finishing transfer lines. It is found that an ICP including a propylene copolymer having a relatively low ethylene or other comonomer (less than 45 wt % based on the copolymer) level can increase the elongation, impact resistance and gloss of the ICP. A magnesium chloride supported titanium catalyst with one or more external donors described in U.S. Pat. No. 6,087,495 was used to produce the ICP described herein. The improved ICP has a higher porosity in the homopolymer granules which allows for a higher content of the ethylene-propylene copolymer phase. The propylene-based ICP described herein is particularly suitable for appliances and other articles and components where both toughness and glossy appearance are important.

In any embodiment, the ICPs described herein are made by physically blending polypropylene homopolymer component(s) and propylene-copolymer component(s), or made in a single reactor process using dual catalysts to produce the different components, or are produced in a series reactor process to produce individual components that are further combined in situ, or in one or more of the reactors. Most preferably, the ICPs described herein are produced in series reactors wherein the polypropylene homopolymer is first produced in one or more slurry reactors by contacting a catalyst and monomers, preferably propylene, such as in slurry-loop reactors well known in the art, followed by combining the same catalyst and formed homopolymer in a single gas-phase reactor with monomers, preferably propylene and ethylene and/or $C_4$ to $C_{10}$ α-olefins, to produce the propylene copolymer such that the copolymer imbeds itself in the homopolymer as discrete domains with the homopolymer as a matrix or "continuous" phase. The MFR of the individual components can be controlled by, for example, addition and removal of hydrogen from the reactors. Most preferably, the homopolymer is produced in two loop-slurry reactors in series and each as a similar or same amount of hydrogen, producing homopolymer of nearly the same or the same MFR. The amount of hydrogen in the gas phase reactor may be the same or different from the loop slurry reactor, such level controlled by removing the hydrogen from the homopolymer stream entering the gas phase reactor or at some other stage. A suitable process and apparatus is described in U.S. Pat. Nos. 9,000,106 and 8,076,419 (column 6, line 6 to column 7, line 16). The systems and processes disclosed therein can be used in a "balanced" reactor scheme where two slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

Thus in any embodiment is an ICP comprising a polypropylene homopolymer and within a range of from 10 or 15 or 20, or 22, or 24 wt % to 26, or 28, or 30, or 35, or 40, or 45 wt % of propylene copolymer based on the weight of the ICP, wherein the copolymer comprises from 20, or 25, or 30, or 35 wt % to 4.0 or 45, or 50, or 5.5 or 60 wt % ethylene, 1-butene, 1-hexene, and/or 1-octene derived units and from 80 to 40 wt % propylene-derived units based on the weight of the propylene copolymer, the propylene-based impact copolymer having a MFR within a range of from 10, or 15, or 20, or 26 g/10 min to 30, or 36, or 40, or 50 g/10 min and an Elongation at Break of greater than 6, or 70, or 80, or 90, or 100% (or within a range from 60 or 80% to 120, or 150, or 300, or 400%). Such an ICP tends to have high toughness, described more herein. Most preferably the propylene copolymer is an ethylene-propylene copolymer.

Also, in any embodiment is an ICP comprising a polypropylene homopolymer and within a range of from 6, or 8, or 10 wt % to 14, or 16, or 20 wt % of propylene copolymer based on the weight of the ICP, wherein the propylene copolymer comprises from 20, or 25, or 30, or 35 wt % to 40, or 45, or 50, or 55, or 60 wt % ethylene, 1-butene, 1-hexene and/or 1-octene derived units and from 80, or 75, or 70, or 65 wt % to 60, or 55, or 50, 45, or 40 wt % propylene-derived units based on the weight of the propylene copolymer, the ICP having a MFR within a range of from 5, or 8, or 12 g/10 min to 20, or 30, or 40, or 50 g/10 min and a surface gloss at 60° of from 40, or 50 to 80, or 90. Such an ICP tends to have an improved gloss (G-ICP) compared to other ICPs, described more herein. Most preferably the propylene copolymer is an ethylene-propylene copolymer.

In any embodiment, the ICP has a molecular weight distribution (Man) within a range from 4, or 5 to 7, or 8. In any embodiment the size exclusion chromatograph (SEC) chromatogram is unimodals, meaning there is only one discernable SEC maximum, which may or may not comprise a shoulder.

In any embodiment, the total comonomer derived unit content, preferably ethylene derived units of the ICP, is within a range from 2 or 2.5 wt % to 4, or 6, or 10, or 16 wt % by weight of the ICP.

In any embodiment, the melting point temperature of the ICP is greater than 155, or 160, or 162° C., or within a range from 155, or 160, or 162° C. to 170 or 180° C.

In any embodiment the polypropylene homopolymer portion of the ICP has an $M_w/M_n$, within a range of from 3.0, or 3.5, or 4.0 to 4.5, or 5.0, or 6.0, or 7.0, or 8.0, or 9.0; and the polypropylene homopolymer portion also has an $M_z/M_w$ of less than 4, or 3.4, or 3.2, or 3.0, or 2.8, or 2.6, or 2.4, or within a range from 2 to 2.5, or 2.6, or 2.8, or 3, or 3.2, or 3.4, or 4. By "polypropylene homopolymer" what is meant is a polymer comprising within a range of from 0, or 0.01, or 0.1, or 0.5 to 2.0, or 3.0 wt %, by weight of the polymer, of ethylene, or $C_4$ to $C_{10}$ α-olefin-derived units, and most preferably refers to a polymer consisting of propylene-derived units. In any embodiment the "propylene copolymer" or "copolymer" is a polymer comprising ethylene, 1-butene, 1-hexene and/or 1-octene derived units, most preferably ethylene derived units.

In any embodiment the isopentad value for the polypropylene homopolymer is greater than 92, or 94, or 96%.

In any embodiment, in particular for an ICP with high gloss, the MFR of the polypropylene homopolymer is within a range from 5, or 10, or 15 g/10 min to 20, or 25, or 30, or 40 g/10 min. In embodiments for an impact copolymer with high toughness, the polypropylene homopolymer has a MFR within a range from 80 or 100 g/10 min to 120, or 140, or 160, or 180, or 200, or 220 g/10 min.

In any embodiment the xylene cold soluble fraction of the ICP described herein, which corresponds to the propylene copolymer portion of the ICP, has a number average molecular weight ($M_n$) within a range from 50,000 or 60,000 g/mole to 80,000 or 100,000 g/mole. In any embodiment, the propylene copolymer has a weight average molecular weight ($M_w$) within a range from 150,000, or 180,000, or 200,000 g/mole to 300,000, or 350,000, or 400,000 g/mole. And further, the propylene copolymer component has a z-average molecular weight ($M_z$) within a range from 400,000, or 450,000, or 500,000, or 550,000 g/mole to 650,000, or 700,000, or 800,000, or 900,000 g/mole.

In any embodiment, the propylene copolymer portion of the ICP described herein has an $M_w/M_n$, within a range of from 3.0, or 3.5, or 4.0 to 4.5, or 5.0, or 6.0, or 7.0, or 8.0, or 9.0. The propylene copolymer component has an $M_z/M_w$ of less than 4, or 3.4, or 3.2, or 3.0, or 2.8, or 2.6, or 2.4, or within a range from 2 to 2.5, or 2.6, or 2.8, or 3, or 3.2, or 3.4, or 4.

In any embodiment, the propylene copolymer portion of the ICP described herein has a melt flow rate within a range from 0.1 or 0.2 g/10 min to 0.6, or 0.8, or 1, or 2 g/10 min.

Also, in any embodiment, the propylene copolymer has an intrinsic viscosity (IV) within a range from 2 or 2.2 dL/g to 4, or 4.4, or 5, or 6 dL/g.

The ICP described herein is heterogeneous, meaning that there are domains of copolymer within a continuous phase of polypropylene homopolymer. Advantageously, the copolymer domains are relatively small, and the two domains are more miscible than prior art ICP heterogeneous domains. Thus, in preferred embodiments of the disclosure the polypropylene homopolymer forms a continuous phase and the copolymer, preferably an ethylene-propylene copolymer, forms copolymer domains having an average size (diameter) of less than 10, or 8, or 5, or 4, or 2 or 1 µm, or within a range of from 0.40, or 0.45, or 0.50 µm to 0.80, or 0.85, or 0.90, or 1, or 2, or 4, or 5, or 8, or 10 µm. Due to this nature of the ICP described herein, the surface of the solid material may have high gloss, and thus, the surface gloss is greater than 80, or 85, or 90 (ASTM D523), or greater than 70, or 75, or 80, or 85 measured at any one of 20, 65, or 80 degrees.

The ICP described herein can desirably be made in a reactor in granules without further processing if desired. Thus, the impact copolymer in a preferred embodiment comprise reactor grade granules having an average particle size within a range of from 1200, or 1300, or 1400, or 1500 µm to 2000, or 2400, or 2800 µm and produced at a rate greater than 30,000, or 35,000 or 40,000, or 45,000 lbs/hr (13,620 kg/hr or 15,890 kg/hr, or 18,160 kg/hr, or 20,430 kg/hr). There are any number of ways of making the ICP described herein, but preferably it is manufactured in a two-step, sequential processes that utilizes a solution or slurry-type polymerization process in the presence of a polymerization catalyst, followed by transfer of the homopolymer-active catalyst to a gas phase reactor where it is further contacted with α-olefin comonomer and propylene to form the copolymer domains within the continuous phase of polypropylene homopolymer. Such processes, individually, are well known in the art, and described for instance in U.S. Pat. No. 8,076,419.

When manufacturing either the homopolymer or copolymer, the properties of each can be tailored to meet certain desired needs to impart desirable final properties in the ICP described herein, and there is a range of desirable properties that the ICP described herein can possess. For instance, the level of hydrogen in the reactor(s) can be adjusted, as can the polymerization temperature, residence time, identity of solvent (if any), as well as other factors.

In any embodiment, the "tough" ICP (T-ICP) has a Heat Deflection Temperature (HDT) within a range of from 70, or 75, or 80, or 85° C. to 95, or 100, or 115, or 125° C.; or greater than 80, or 84, or 86, or 80, or 92° C. at 66 psi (ASTM D648). In any embodiment, the G-ICP has a HDT within a range of from 100, or 110° C. to 130, or 135, or 140, or 150° C.; or greater than 100 or 110° C. at 66 psi (ASTM D648).

Also, in any embodiment the ICP has a flexural modulus (1% Secant, ASTM D 790A) of greater than 200, or 220, or 250, or 300 kpsi, or within a range of from 120, or 130, or 140 kpsi to 200, or 225, or 250, or 300, or 400 kpsi. The tensile strength at yield of the ICP described herein is preferably within a range of from 2500 or 2600 psi to 3500, or 4500, or 5500 psi; or greater than 2800, or 2900, or 3000, or 3200 psi.

One advantage of the T-ICP is its desirable impact properties. For instance, the notched Izod impact at 23° C. as measured by ASTM D256A of the ICP described herein is preferably greater than 4, or 5, or 6, or 8 ft-lb/in (213 J/m, or 267 J/m, or 320 J/m, or 426 J/m) (or within a range from 4 or 5, or 6, or 8 ft-lb/in to 10, or 12, or 14 ft-lb/in; 213 or 426 J/m to 533, or 640, or 693 J/m). Also, the notched Izod impact at 23° C. as measured by ISO 180/A is preferably greater than 8, or 10, or 12, or 14, or 20 kJ/m$^2$ (or within a range of from 8 or 10 kJ/m$^2$ to 16, or 20, or 30, or 40, or 50, or 60 kJ/m$^2$).

The disclosure described herein can include compositions of the ICP with other polymeric materials and common additives. Desirable polymeric materials include polypropylene homopolymers (as defined above), propylene-based elastomers (such as Vistamaxx™ propylene-based elastomers), ethylene-based plastomers, elastomers such as EP rubber, EPDM, butyl rubber, styrenic copolymers and block copolymers, and other impact copolymers, especially so called "high-comonomer" impact copolymers, which are defined as propylene-based impact copolymers having greater than 44 wt % comonomer-derived units in the copolymer portion. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives. These polymeric materials and additives may be compounded with the ICP described herein by traditional blending such as in a Brabender mixer, or extruded in a single or double screw extruder, and can possibly be formed in to a thermoplastic vulcanizate as is well known in the art.

The ICPs described herein are also useful in appliances, having a glossy appearance desirable in appliance components as quantified in a measured a surface gloss value of greater than 80, or 85, or 90 measured at 60 degrees. For instance the ICPs described herein are useful in washing machine components, refrigerator components, electronic articles (e.g., stereos, radios, lap-top computers, desk-top computers, hand-held devices, etc.), mixing devices, and other tools and domestic wear. More particular uses of the G-ICP include washing machine lids, control panel, vacuum cleaner components, water dispenser panels, window air conditioning casing, and refrigerator door buckets and bins. Such ICPs may also be combined with colorants, fillers and/or other polymers such as propylene-based elastomers, other impact copolymers, or ethylene-based plastomers, any of which may individually be present from 5 wt % to 20 or 30 wt %, by weight of all the components. Most preferably the G-ICP is blended only with colorants, antioxidants, and other minor additives to less than 4 or 2 wt % by weight of the components.

In a class of embodiments, the article described herein may comprise in the substrate an ICP (as an ICP, preferably a G-ICP, defined herein), based on total weight of the substrate, the ICP comprising a polypropylene homopolymer and within the range of from 6 to 20 wt % of propylene copolymer based on the weight of the ICP, wherein the propylene copolymer comprises from 20 to 60 wt % ethylene and/or $C_4$ to $C_{10}$ α-olefin derived units and the remainder propylene-derived units based on the weight of the propylene copolymer, the ICP having a melt flow rate (MFR) (230° C./2.16 kg) within the range of from 5 to 50 g/10 min. In various embodiments, the ICP may have one or more of the following properties:

a density (as measured at room temperature based on ASTM D1505) of 0.860 to 0.920 g/cm$^3$, or 0.880 to 0.900 g/cm$^3$;

a melt mass-flow rate (MFR) (as measured based on ASTM D1238, 2.16 kg at 230° C.) of from 5 to 50 g/10 min, or from 8 to 30 g/10 min, or from 10 to 15 g/10 min;

an ethylene and/or $C_4$ to $C_{10}$ α-olefin derived unit content of from 20 to 60 wt %, or from 25 to 50 wt %, or from 30 to 40 wt %, based on the weight of the propylene copolymer;

a flexural modulus (1% Secant, as measured based on ASTM D 790A) of within a range of from 150 to 400 kpsi, or from 200 to 300 kpsi, or from 225 to 250 kpsi; and/or a surface gloss at 60° (as measured based on ASTM D523) of at least 80, 85, or 90.

In one embodiment, the ICP in the substrate is present in an amount of at least 80 wt %, for example, 80 wt %, 82 wt %, 84 wt %, 86 wt %, 90 wt %, 92 wt %, 94 wt %, 96 wt %, 98 wt %, 100 wt %, or vary in the range of any combination of the values recited herein, based on total weight of the substrate. Preferably, the ICP is present in an amount of 100 wt %, based on total weight of the substrate.

The various descriptive elements and numerical ranges disclosed herein for the ICPs described herein and compositions of the ICPs can be combined with other descriptive elements and numerical ranges to describe the disclosure; further, for a given element, any upper numerical limit can be combined with any lower numerical limit described herein. An element may vary in the range of any combination of the values recited herein.

Propylene-Based Elastomer

The propylene-based elastomer useful in the article described herein is a copolymer of propylene-derived units and units derived from at least one of ethylene or a $C_4$-$C_{10}$ alpha-olefin. The propylene-based elastomer may contain at least 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of 95 wt %, 94 wt %, 92 wt %, 90 wt %, or 85 wt %, to a lower limit of 60 wt %, 65 wt %, 70 wt %, 75 wt %, 80 wt %, 84 wt %, or 85 wt %, of the propylene-based elastomer.

The units, or comonomers, derived from at least one of ethylene or a $C_4$-$C_{10}$ alpha-olefin may be present in an amount of 1 to 35 wt %, or 5 to 35 wt %, or 7 to 30 wt %, or 8 to 25 wt %, or 8 to 20 wt %, or 8 to 18 wt %, of the propylene-based elastomer. The comonomer content may be adjusted so that the propylene-based elastomer has a heat of fusion of less than 80 J/g, a melting point of 105° C. or less, and a crystallinity of 2% to 65% of the crystallinity of isotactic polypropylene, and a fractional melt mass-flow rate of 0.5 to 20 g/min.

In preferred embodiments, the comonomer is ethylene, 1-hexene, or 1-octene, with ethylene being most preferred. In embodiments where the propylene-based elastomer comprises ethylene-derived units, the propylene-based elastomer may comprise 3 to 25 wt %, or 5 to 20 wt %, or 9 to 18 wt % of ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or fractional melt mass-flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than 5 wt % of the propylene-based elastomer, but the combined amount of comonomers of the propylene-based elastomer is 5 wt % or greater.

The propylene-based elastomer may have a triad tacticity of three propylene units, as measured by $^{13}C$ NMR, of at least 75%, at least 80%, at least 82%, at least 85%, or at least 90%. Preferably, the propylene-based elastomer has a triad tacticity of 50 to 99%, or 60 to 99%, or 75 to 99%, or 80 to 99%. In some embodiments, the propylene-based elastomer may have a triad tacticity of 60 to 97%.

The propylene-based elastomer has a heat of fusion ("$H_f$"), as determined by DSC, of 80 J/g or less, or 70 J/g or less, or 50 J/g or less, or 40 J/g or less. The propylene-based elastomer may have a lower limit $H_f$ of 0.5 J/g, or 1 J/g, or 5 J/g. For example, the $H_f$ value may range from a lower limit of 1.0, 1.5, 3.0, 4.0, 6.0, or 7.0 J/g, to an upper limit of 35, 40, 50, 60, 70, 75, or 80 J/g.

The propylene-based elastomer may have a percent crystallinity, as determined according to the DSC procedure described herein, of 2 to 65%, or 0.5 to 40%, or 1 to 30%, or 5 to 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of 0.25 to 25%, or in the range of 0.5 to 22%, of the crystallinity of isotactic polypropylene.

Embodiments of the propylene-based elastomer may have a tacticity index m/r from a lower limit of 4 or 6, to an upper limit of 8, or 10, or 12. In some embodiments, the propylene-based elastomer has an isotacticity index greater than 0%, or within the range having an upper limit of 50% or 25%, and a lower limit of 3% or 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkylene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of 15%, 10%, 7%, 5%, 4.5%, 3%, 2.5%, or 1.5%, to a lower limit of 0%, 0.1%, 0.2%, 0.3%, 0.5%, 1%, 3%, or 5%, based on the total weight of the propylene-based elastomer.

The propylene-based elastomer may have a single peak melting transition as determined by DSC. In some embodiments, the copolymer has a primary peak transition of 90° C. or less, with a broad end-of-melt transition of 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of 110° C. or less, 105° C. or less, 100° C. or less, 90° C. or less, 80° C. or less, or 70° C. or less. In some embodiments, the propylene-based elastomer has a $T_m$ of 25 to 110° C., or 40 to 105° C., or 60 to 105° C.

The propylene-based elastomer may have a density of 0.850 to 0.900 g/cm$^3$ or 0.860 to 0.880 g/cm$^3$, at room temperature as measured based on ASTM D1505.

The propylene-based elastomer may have a fractional melt mass-flow rate (MFR), as measured based on ASTM D1238, 2.16 kg at 230° C., of at least 0.5 g/10 min. In some embodiments, the propylene-based elastomer may have a fractional MFR of 0.5 to 20 g/10 min or 2 to 20 g/10 min.

The propylene-based elastomer may have an Elongation at Break of less than 2000%, less than 1800%, less than 1500%, or less than 1000%, as measured based on ASTM D638.

The propylene-based elastomer may have a weight average molecular weight ($M_w$) of 5,000 to 5,000,000 g/mol, or 10,000 to 1,000,000 g/mol, or 50,000 to 400,000 g/mol. The propylene-based elastomer may have a number average molecular weight ($M_n$) of 2,500 to 250,000 g/mol, or 10,000 to 250,000 g/mol, or 25,000 to 250,000 g/mol. The propylene-based elastomer may have a z-average molecular weight (Mt) of 10,000 to 7,000,000 g/mol, or 80,000 to 700,000 g/mol, or 100,000 to 500,000 g/mol.

The propylene-based elastomer may have a molecular weight distribution ("MWD") of 1.5 to 20, or 1.5 to 15, or 1.5 to 5, or 1.8 to 3, or 1.8 to 2.5.

The $M_w$, $M_n$, and $M_w/M_n$, were determined by using a High Temperature GPC (Agilent PL-220), equipped with three in-line detectors, a differential refractive index detector ("DRI"), a light scattering ("LS") detector, and a viscometer. Detector calibration is described in a paper by T. Sun, P. Brant, R. R. Chance, and W. W. Graessley, in 34(19) MACROMOLECULES, 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene ("TCB"). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at 160° C. with continuous shaking for 2 hours. All quantities were measured gravimetrically. The TCB densities used to express the polymer concentration in mass/volume units were 1.463 g/ml at 23° C. and 1.284 g/ml at 145° C. The injection concentration was from 0.5 to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI}/(dn/dc),$$

where KDRI is a constant determined by calibrating the DRI, and (dn/dc) is the incremental refractive index for the system. The refractive index, n, was 1.500 for TCB at 145° C. and λ was 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above. Values for $M_n$ are ±50 g/mole, and for $M_w$ are ±100 g/mole.

A high temperature Viscotek Corporation viscometer, which has four capillaries arranged in a Wheatstone bridge configuration with two pressure transducers, was used to determine specific viscosity and branching. One transducer measures the total pressure drop across the detector, and the other, positioned between the two sides of the bridge, measures a differential pressure. The specific viscosity ($\eta_s$) for the solution flowing through the viscometer was calculated from their outputs. The intrinsic viscosity, [η], at each point in the chromatogram was calculated from the following equation:

$$\eta_s c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits. For data processing, the Mark-Houwink constants used were K=0.000579 and a=0.695.

Suitable propylene-based elastomers may be available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins, Netherlands). The particular grade(s) of commercially available propylene-based elastomer suitable for use in the invention can be readily determined using methods commonly known in the art.

In one embodiment of the present invention, the article described herein comprises in the body part a propylene-based elastomer (as a propylene-based elastomer defined herein) having at least 60 wt % propylene-derived units and 3 to 25 wt % ethylene-derived units, based on total weight of the propylene-based elastomer, and a heat of fusion of less than 80 J/g. Specifically, the propylene-based elastomer may be an elastomer consisting essentially of units derived from propylene and ethylene, including propylene-crystallinity, a melting point by DSC equal to or less than 105° C., and a heat of fusion of from 5 J/g to 35 J/g. The propylene-derived units are present in an amount of 80 to 90 wt %, based on the total weight of the propylene-based elastomer. The ethylene-derived units are present in an amount of 6 to 18 wt %, for example, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18 wt %, based on the total weight of the propylene-based elastomer.

The propylene-based elastomer present in the body part of the article described herein may be optionally in a blend with one or more other polymers, such as propylene-based elastomers defined herein, which blend is referred to as propylene-based elastomer composition. The propylene-based elastomer composition may include one or more different propylene-based elastomers, i.e., propylene-based elastomers each having one or more different properties such as, for example, different comonomer or comonomer content. Such combinations of various propylene-based elastomers are all within the scope of the invention.

The propylene-based elastomer in the body part of the article described herein is present in an amount of at least at least 50 wt %, for example, 50 wt %, 55 wt %, 60 wt %, 65 wt %, 70 wt %, 75 wt %, 80 wt %, 85 wt %, 90 wt %, 95 wt %, or 100 wt %, or in the range of any combination of the values recited herein, based on total weight of the body part.

Other Propylene-Based Polymers

In one preferred embodiment of the present invention, the article of the present invention further comprises in at least one of the substrate and the body part a propylene-based polymer that may be the same as or different than the propylene-based elastomer described above. Such "propylene-based polymer" or "polypropylene" that is optionally useful in the article described herein is a homopolymer or copolymer comprising from 60 wt %, or 70 wt %, or 80 wt %, or 85 wt %, or 90 wt %, or 95 wt %, or 98 wt %, or 99 wt % to 100 wt % propylene-derived units (and comprising within the range of from 0 wt %, or 1 wt %, or 5 wt % to 10 wt %, or 15 wt %, or 20 wt %, or 30 wt %, or 40 wt % $C_2$, and/or $C_4$ to $C_{10}$ α-olefin derived units) and can be made by any desirable process using any desirable catalyst as is known in the art, such as a Ziegler-Natta catalyst, a metallocene catalyst, or other single-site catalyst, using solution, slurry, high pressure, or gas phase processes. Polypropylene copolymers are useful polymers in certain embodiments, especially copolymers of propylene with ethylene and/or butene, and comprise propylene-derived units within the range of from 70 wt % or 80 wt % to 95 wt % or 98 wt % by weight of the polypropylene copolymer. In any case, useful propylene-based polymers have a melting point (ASTM D3418) of at least 125° C. or 130° C. or 140° C. or 150° C. or 160° C., or within a range of from 125° C. or 130° C. to 140° C. or 150° C. or 160° C. A "highly crystalline" propylene-based polymer is useful in certain embodiments, and is typically isotactic and comprises 100 wt % propylene-derived units (polypropylene homopolymer) and has a relatively high melting point of greater than or equal to 140° C., or 145° C., or 150° C., or 155° C., or 160° C., or 165° C.

The term "crystalline," as used herein, characterizes those polymers which possess high degrees of inter- and intra-molecular order. Preferably, the propylene-based polymer has a heat of fusion ($H_f$) greater than 60 J/g or 70 J/g or 80 J/g, as determined by DSC analysis. The heat of fusion is dependent on the composition of the propylene-based polymer; the thermal energy for the highest order of propylene-based polymer is estimated at 189 J/g that is, 100% crystallinity is equal to a heat of fusion of 189 J/g. A polypropylene homopolymer will have a higher heat of fusion than a copolymer or blend of homopolymer and copolymer. Also, the propylene-based polymers useful herein may have a glass transition temperature (ISO 11357-1, $T_g$) preferably between −20° C., or −10° C., or 0° C. to 10° C., or 20° C., or 40° C., or 50° C. Preferably, the propylene-based polymers have a Vicat softening temperature (ISO 306, or ASTM D1525) of greater than 120° C., or 110° C., or 105° C., or 100° C., or within a range of from 100° C., or 105° C. to 110° C., or 120° C., or 140° C., or 150° C., or a particular range of from 110° C., or 120° C. to 150° C.

As used within this specification, DSC procedures for determining $T_m$ and $H_f$ include the following. From 6 mg to 10 mg of a sheet of the polymer pressed at approximately 200° C. to 230° C. is removed with a punch die. This is annealed at room temperature for at least 2 weeks. As used herein, the term "room temperature" is used to refer to the temperature range of 20° C. to 23.5° C. At the end of this period, the sample is placed in a Differential Scanning calorimeter (Perkin Elmer DSC 8000) and cooled to −50° C. to −70° C. at a cooling rate of 10° C./min. The sample is heated at 10° C./min to attain a final temperature of 200° C. to 220° C. The thermal output is recorded as the area under the melting peak of the sample which is typically peaked at 30° C. to 175° C. and occurs between the temperatures of 0° C. and 200° C. is a measure of the heat of fusion expressed in Joules per gram of polymer. The melting point is recorded as the temperature of the greatest heat absorption within the range of melting of the sample.

Preferably, the propylene-based polymer has a melt flow rate ("MFR", 230° C., 2.16 kg, ASTM D1238) within the range of from 0.1 g/10 min, or 0.5 g/10 min, or 1 g/10 min to 4 g/10 min, or 6 g/10 min, or 8 g/10 min, or 10 g/10 min, or 12 g/10 min, or 16 g/10 min, or 20 g/10 min. Also, the propylene-based polymer may have a molecular weight distribution (determined by GPC) of from 1.5, or 2.0, or 2.5 to 3.0, or 3.5, or 4.0, or 5.0, or 6.0, or 8.0, in certain embodiments. Suitable grades of propylene-based polymer that are useful in the articles described herein include those made by ExxonMobil, LyondellBasell, Total, Borealis, Japan Polypropylene, Mitsui, and other sources.

In particular, the propylene-based polymer present in the body part of the article described herein may be optionally in a blend with one or more other polymers, such as propylene-based polymers defined herein, which blend is referred to as polypropylene composition. In particular, the polypropylene compositions described herein may be physical blends or in situ blends of more than one type of polypropylene or compositions of polypropylenes with polymers other than polypropylenes where the polypropylene component is the majority component, e.g., greater than 50 wt % of the total weight of the composition.

In another preferred embodiment, the propylene-based polymer comprises one or more of (i) a polypropylene homopolymer; (ii) a copolymer derived from propylene and one or more $C_2$, and/or $C_4$ to $C_{10}$ α-olefin comonomers, wherein the copolymer has at least 60 wt % propylene-derived units, based on total weight of the copolymer; and (iii) an ICP having between 75 and 95 wt % homopolypropylene and between 5 and 30 wt % of propylene copolymer based on the weight of the ICP, wherein propylene copolymer comprises less than 50 wt % ethylene, and/or $C_4$ to $C_{10}$ α-olefin derived units and the remainder propylene-derived units based on the weight of the propylene copolymer; and blends thereof.

Filler

The body part of the article described herein may also include a filler. The classes of materials described herein that are useful as fillers can be utilized alone or admixed to obtain desired properties. Desirable fillers can be organic fillers and/or inorganic fillers. Organic fillers include such materials as carbon black, fly ash, graphite, cellulose, starch, flour, wood flour, and polymeric fibers like polyester-based, polyamide-based materials, etc. Preferred examples of inorganic fillers are calcium carbonate, talc, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres and chalk. Of these fillers, calcium carbonate, barium sulfate, antimony oxide, talc, silica/glass, glass fibers, alumina, aluminum trihydroxide, magnesium hydroxide and titanium dioxide, and mixtures thereof are preferred.

Preferably, the filler may be present in an amount of no more than 10 wt %, no more than 8 wt %, no more than 6 wt %, no more than 4 wt %, no more than 2 wt %, or no more than 1 wt %, based on total weight of the body part.

Methods for Making the Article

Also provided are methods for making articles of the present invention. The articles described herein may be formed by any of the conventional overmolding techniques known in the art, including two commonly employed examples as follow:

Insert Molding

An insert, i.e. a part pre-formed as substrate by a first molding material in a substrate mold cavity is placed into an overmold cavity in which the overmolding material will be injected. The substrate mold cavity and the overmold cavity can be in two different molds mounted in two different injector presses or in one and the same double mold.

Multiple Material (Also Known as Two-Shot or Multi-Shot) Molding

An injection molding machine equipped with two or more barrels allows two or more materials to be shot into the same mold cavity during the same molding cycle. The system is designed to make the second material pass through the first one to create separate layers or parts made of different materials, which reduces cycle time and labor consumption.

Factors that determine choice of the appropriate overmolding method include production scale economics, labor costs, available equipment, and selected materials. For some overmolding materials, there may be a significant difference in bond strength between multi-shot and insert molding. Even if an excellent bond is achieved with two-shot molding, the same material may demonstrate poor bond strength when insert molded. Thus, a thorough understanding of the overmolding materials and substrate, and associated details molding these materials is essential to produce high quality finished products.

In one embodiment where the article described herein is prepared by insert molding, an injection molding apparatus is conventionally configured to include a mold comprising a mold cavity, a plastic melt injection system, a sensor, and a controller. Typically, a pre-formed substrate is positioned (e.g., secured) in the mold cavity. Overmolding material is heated in a melt holder of the injection molding apparatus, or injection molding station, to a predetermined temperature. The predetermined temperature that the overmolding material is heated to may be less than a manufacturer's recommended injection temperature, and specifically, less than the lowest recommended manufacturer's injection temperature. For example, if a manufacturer's lowest recommended injection temperature is 200° C. for a certain overmolding material, the overmolding material may be injected at, for example, 150° C. using the apparatus and method described herein. Because the overmolding material is injected at a lower temperature, less freezing time is required, thereby reducing overall cycle time as well.

After the overmolding material is heated, the overmolding material is injected using a plastic melt injection system or injection element into one or more mold cavities of the injection molding apparatus (e.g., a single mold cavity or at least two mold cavities) and allowed to substantially freeze, thereby forming an overmolded article. The overmolded article may subsequently be cooled in some embodiments and/or subject to a second injection process.

In one embodiment, a method for making an article may comprise the steps of: (a) preparing a substrate comprising at least 80 wt % of an ICP, based on total weight of the substrate, the ICP comprising a polypropylene homopolymer and within the range of from 6 to 20 wt % of propylene copolymer based on the weight of the ICP, wherein the propylene copolymer comprises from 20 to 60 wt % ethylene, and/or $C_4$ to $C_{10}$ α-olefin derived units and the remainder propylene-derived units based on the weight of the propylene copolymer, the ICP having an MFR (230° C./2.16 kg) within the range of from 5 to 50 g/10 min; (b) preparing a body part comprising at least 50 wt % of a propylene-based elastomer, based on total weight of the body part, comprising at least 60 wt % propylene-derived units and 3 to 25 wt % ethylene-derived units, based on the total weight of the propylene-based elastomer, wherein the propylene-based elastomer has a heat of fusion of less than 80 J/g; and (c) forming an article comprising the substrate and the body part by attaching the body part to the substrate. Preferably, the body part is overmolded onto the substrate according to any overmolding process described herein. Preferably, the ICP in the substrate has at least one of the following properties: (i) a surface gloss at 60° of greater than 80; (ii) a density of 0.860 to 0.920 g/cm$^3$; and (iii) a 1% Secant flexural modulus of 150 to 400 kpsi. Preferably, the ICP in the substrate is present in an amount of 100 wt %, based on total weight of the substrate.

The substrate and the body part of the article described herein may remain attached to each other under a peeling force of 900 N. The inventive article formed by combining the substrate and the body part described herein can benefit from outstanding bond strength for the two parts to remain attached to each other when subject to considerable peeling force, indicating its desirable reliability for future use in overmolding applications heavily depending on the ABS-based substrate.

It has been discovered that use of the ICP described herein in the substrate of an overmolded article can obtain surface gloss comparable to the level achievable with a conventional substrate made of ABS, accompanied by desired stiffness performance Meanwhile, outstanding compatibility between two propylene-based parts can ensure reliable bond strength between such substrate and an overmolding body part comprising the propylene-based elastomer described herein, thus leading to desired impact absorption performance of the body part imparted by the propylene-based elastomer. Therefore, by overcoming the longstanding obstacle in exploring comprehensive potential of propylene-based elastomer in overmolding applications dominated by ABS-based substrate, the inventive overmolded article can conveniently deliver a coupling of advantages from both the ICP and the propylene-based elastomer described herein in one united article without compromising other properties. This makes the inventive article particularly qualified for overmolding applications highlighting glossy surface and well-balanced overall performance.

EXAMPLES

The present invention, while not meant to be limited by, may be better understood by reference to the following example and table.

Four inventive article samples (Samples 1-4) in comparison with two comparative samples (Comparative 1 and Comparative 4) were prepared as follows on a two-shot injection molding machine with two independent injection units: (i) forming a substrate by injecting a substrate material into the substrate cavity of a T-bar shaped mold via a first injection unit with processing parameters including a screw diameter of 40 mm, an L/D ratio of 20, a shot weight of 206 g, and a clamping force of 180 ton; (ii) injecting a pre-melt overmolding mixture into the body part cavity of the same T-bar shaped mold onto the above-formed substrate via a second injection unit to form a body part attached to the substrate, with processing parameters including a screw diameter of 40 mm, an L/D ratio of 20, a shot weight of 210 g, and a clamping force of 130 ton; and (iii) obtaining a T-bar shaped article after sufficient cooling. Polymer and filler products used in the samples include: PP-ICP polymer (as the ICP defined herein) (density: 0.900 g/cm$^3$, MFR (230° C./2.16 kg): 11 g/10 min, ethylene content: 4.2 wt %, surface gloss at 60°: 89) (ExxonMobil Chemical Company, Houston, Tex., USA); PBE1 (as the propylene-based elastomer define herein) (ethylene content: 15 wt %, density: 0.862 g/cm$^3$, MFR (230° C./2.16 kg): 20 g/10 min), and PBE2 (as the propylene-based elastomer define herein) (ethylene content: 6 wt %, density: 0.879 g/cm$^3$, viscosity @ 190° C.: 1200 mPa·s) (ExxonMobil Chemical Company, Houston, Tex., USA), RCP (as the propylene-based polymer other than the propylene-based elastomer) (density: 0.900 g/cm$^3$, MFR (230° C./2.16 kg): 24 g/10 min) (ExxonMobil Chemical Company, Houston, Tex., USA), POLYLAC™ PA-757 ABS resin (referred to as ABS hereafter) (Chi Mei Corporation, Taiwan); OMYACARB™ 2T LU calcium carbonate masterbatch (referred to as filler) (Omya AG, Switzerland).

Capability of a sample to withstand peeling force was measured by a peeling test, which was conduct in accordance with TPE-0056 using the Instron Model 3365 Tensile Tester for all inventive samples and was applied directly by hand to comparative samples. The inventive samples were fixed with the substrate clamped by the lower sample holder and the body part clamped by the upper grip. Varied peeling force up to 900 N (maximum value allowed by safe machine operation) is exerted on the body part via the upper grip for pulling upwards, the value of which is recorded when the body part is peeled off the substrate.

Structure-wise formulations (based on total weight of the part) of the article samples and corresponding peeling test results are listed below in Table 1.

TABLE 1

Structure-wise formulations (wt %) and test results of all samples

| Sample No. | Substrate | Body Part | Test Result |
| --- | --- | --- | --- |
| 1 | PP-ICP (100) | PBE1 (70) RCP (30) | No break under 900N |
| Comparative 1 | ABS (100) | PBE1 (70) RCP (30) | Easy breakage by hand |
| 2 | PP-ICP (100) | PBE1 (60) RCP (30) Filler (10) | No break under 900N |
| 3 | PP-ICP (100) | PBE1 (60) PP-ICP (30) Filler (10) | No break under 900N |
| 4 | PP-ICP (100) | PBE1 (54) PBE2 (6) RCP (30) Filler (10) | No break under 900N |
| Comparative 4 | ABS (100) | PBE1 (54) PBE2 (6) RCP (30) Filler (10) | Easy breakage by hand |

As shown by Table 1, all inventive samples remained intact without being torn apart under a peeling force as high as 900 N, the maximum achievable with the test equipment, while the two comparative samples with an ABS-based substrate even failed to survive peeling force readily applied by bare hand, indicating outperformance by the inventive samples in highly competitive bond strength between the propylene-based substrate and body part. In step with the reliable bond strength, good processability during preparation, desired stiffness, and comfortable hand feel of the overmolded article were also seen for the inventive samples. Therefore, without being bound by theory, it can be concluded that construction of an overmolded article as set out herein can reliably replace ABS to secure desired gloss together with well-accomplished overall performance, thus leading to favored convenience and flexibility in product design for overmolding applications focusing on high gloss such as home appliance industry.

As used herein, "consisting essentially of" means that the claimed composition or article may include up to 5 wt % of additives such as fillers, antioxidants, and other materials but excludes materials that change the overall nature of the composition, such as the presence of primers or adhesives for bonding materials to the substrate, such as epoxys, cyanoacrylates, styrenic-copolymers and styrenic block copolymers, and the like; for processes, "consisting essentially of" means that the process does not include steps that materially alter the end product, such as steps to add primers or adhesives.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. An article, comprising a substrate and a body part attached to the substrate, wherein
   (a) the substrate comprises at least 80 wt % of an impact copolymer (ICP), based on total weight of the substrate, the ICP comprising a polypropylene homopolymer and within the range of from 6 to 20 wt % of propylene copolymer based on the weight of the ICP, wherein the propylene copolymer comprises from 20 to 60 wt % ethylene and/or $C_4$ to $C_{10}$ α-olefin derived units and the remainder propylene-derived units based on the weight of the propylene copolymer, the ICP having a melt flow rate (MFR) (230° C./2.16 kg) within the range of from 5 to 50 g/10 min; and
   (b) the body part comprises at least 50 wt % of a propylene-based elastomer, based on total weight of the body part, comprising at least 60 wt % propylene-derived units and 3 to 25 wt % ethylene-derived units, based on the total weight of the propylene-based elastomer, wherein the propylene-based elastomer has a heat of fusion of less than 80 J/g,
   wherein the substrate and the body part remain attached to each other under a peeling force of 900 N.

2. The article of claim 1, wherein the ICP in the substrate has at least one of the following properties: (i) a surface gloss at 60° of greater than 80; (ii) a density of 0.860 to 0.920 g/cm$^3$; and (iii) a 1% Secant flexural modulus of 150 to 400 kpsi.

3. The article of claim 1, wherein at least one of the substrate and the body part further comprises a propylene-based polymer.

4. The article of claim 3, wherein the propylene-based polymer comprises one or more of (i) a polypropylene homopolymer; (ii) a copolymer derived from propylene and one or more $C_2$ and/or $C_4$ to $C_{10}$ α-olefin comonomers, wherein the copolymer has at least 60 wt % propylene-derived units, based on total weight of the copolymer; and (iii) an ICP having between 75 and 95 wt % homopolypropylene and between 5 and 30 wt % of propylene copolymer based on the weight of the ICP, wherein propylene copolymer comprises less than 50 wt % ethylene and/or $C_4$ to $C_{10}$ α-olefin derived units and the remainder propylene-derived units based on the weight of the propylene copolymer; and blends thereof.

5. The article of claim 1, wherein the ICP in the substrate is present in an amount of 100 wt %, based on total weight of the substrate.

6. The article of claim 1, wherein the body part further comprises a filler.

7. The article of claim 6, wherein the filler is present in an amount of no more than 10 wt %, based on total weight of the body part.

8. The article of claim 1, wherein the body part is overmolded onto the substrate.

9. A method for making an article, comprising the steps of:
   (a) preparing a substrate comprising at least 80 wt % of an ICP, based on total weight of the substrate, the ICP comprising a polypropylene homopolymer and within the range of from 6 to 20 wt % of propylene copolymer based on the weight of the ICP, wherein the propylene copolymer comprises from 20 to 60 wt % ethylene and/or $C_4$ to $C_{10}$ α-olefin derived units and the remainder propylene-derived units based on the weight of the propylene copolymer, the ICP having an MFR (230° C./2.16 kg) within the range of from 5 to 50 g/10 min;
   (b) preparing a body part comprising at least 50 wt % of a propylene-based elastomer, based on total weight of the body part, comprising at least 60 wt % propylene-derived units and 3 to 25 wt % ethylene-derived units, based on the total weight of the propylene-based elastomer, wherein the propylene-based elastomer has a heat of fusion of less than 80 J/g; and
   (c) forming an article comprising the substrate and the body part by attaching the body part to the substrate, wherein the substrate and the body part remain attached to each other under a peeling force of 900 N.

10. The method of claim 9, wherein the article in step (c) is formed by overmolding the body part onto the substrate.

11. The method of claim 10, wherein the body part is overmolded onto the substrate by two-shot molding or insert molding.

12. The method of claim 9, wherein the ICP in the substrate has at least one of the following properties: (i) a surface gloss at 60° of greater than 80; (ii) a density of 0.860 to 0.920 g/cm$^3$; and (iii) a 1% Secant flexural modulus of 150 to 400 kpsi.

13. The method of claim 9, wherein the ICP in the substrate is present in an amount of 100 wt %, based on total weight of the substrate.

14. A home appliance comprising the article of claim 1.

* * * * *